United States Patent
Konishi (10) Patent No.: US 9,079,529 B2
(45) Date of Patent: Jul. 14, 2015

(54) VEHICLE LIGHTING UNIT AND LIGHT GUIDE LENS

(71) Applicant: Stanley Electric Co., Ltd., Tokyo (JP)

(72) Inventor: Sadayuki Konishi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 86 days.

(21) Appl. No.: 13/749,674

(22) Filed: Jan. 24, 2013

(65) Prior Publication Data

US 2013/0188377 A1    Jul. 25, 2013

(30) Foreign Application Priority Data

Jan. 24, 2012  (JP) .................................. 2012-012146

(51) Int. Cl.
| | |
|---|---|
| *B60Q 1/04* | (2006.01) |
| *F21V 5/04* | (2006.01) |
| *F21S 8/10* | (2006.01) |
| *B60Q 1/00* | (2006.01) |
| *F21S 8/12* | (2006.01) |

(52) U.S. Cl.
CPC ............... *B60Q 1/04* (2013.01); *F21S 48/1104* (2013.01); *F21S 48/1159* (2013.01); *F21S 48/137* (2013.01); *F21S 48/1329* (2013.01); *F21S 48/1335* (2013.01); *F21V 5/04* (2013.01); *B60Q 1/0011* (2013.01); *F21S 8/10* (2013.01); *F21S 8/12* (2013.01)

(58) Field of Classification Search
CPC .......... B60Q 1/04; B60Q 1/0011; F12V 5/04; F21S 8/10; F21S 8/12
USPC .......... 362/511, 327, 507, 518, 538, 540–542
See application file for complete search history.

(56) References Cited

U.S. PATENT DOCUMENTS

| | | | | |
|---|---|---|---|---|
| 7,857,495 | B2 * | 12/2010 | Misawa et al. ................ | 362/511 |
| 7,946,743 | B2 * | 5/2011 | Natsume et al. .............. | 362/516 |
| 2009/0027911 | A1 * | 1/2009 | Misawa et al. ................ | 362/518 |
| 2011/0085343 | A1 * | 4/2011 | Ohno et al. .................... | 362/510 |

FOREIGN PATENT DOCUMENTS

JP    2007-317604 A    12/2007

* cited by examiner

*Primary Examiner* — Diane Lee
*Assistant Examiner* — Mitchell Errett
(74) *Attorney, Agent, or Firm* — Kenealy Vaidya LLP (57) ABSTRACT

A vehicle lighting unit serving as a vehicle headlight can form a light distribution pattern optimized according to the country or the area with a smaller number of parts when compared with the conventional vehicle headlights of this type. Further, there can be provided a light guide lens for use in such a vehicle lighting unit.

13 Claims, 7 Drawing Sheets

Fig. 2

Fig. 3A      Fig. 3B for North America      for Europe

000
VEHICLE LIGHTING UNIT AND LIGHT GUIDE LENS

This application claims the priority benefit under 35 U.S.C. §119 of Japanese Patent Application No. 2012-012146 filed on Jan. 24, 2012, which is hereby incorporated in its entirety by reference

TECHNICAL FIELD

The presently disclosed subject matter relates to vehicle lighting units and light guide lenses, and in particular, to a vehicle lighting unit that can form a light distribution pattern optimized according to the country or the area as well as a light guide lens for use in such a vehicle lighting unit.

BACKGROUND ART

A vehicle headlight proposed, for example, in Japanese Patent Application Laid-Open No. 2007-317604 is configured to form a certain light distribution pattern depending on the country or the area.

Figure 1:
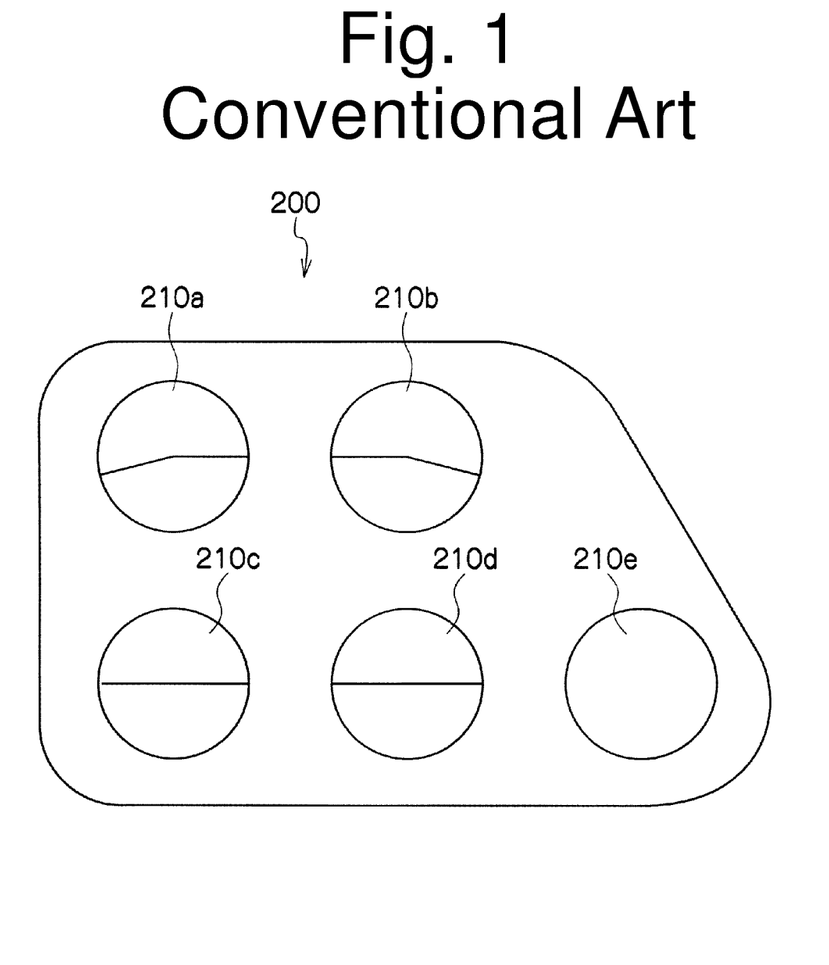
FIG. 1 is a front view of a conventional vehicle headlight.

FIG. 1 is a front view of a vehicle headlight 200 as described in Japanese Patent Application Laid-Open No. 2007-317604.

As shown in FIG. 1, the vehicle headlight 200 can include a plurality of optical units 210a to 210e each configured to form a different light distribution pattern. Therefore, when the optical units 210a to 210e are controlled to be turned on or off, the vehicle headlight 200 can form a particular light distribution pattern according to the country or the area.

However, although the vehicle headlight 200 as described in Japanese Patent Application Laid-Open No. 2007-317604 is capable of forming different light distribution patterns depending on the country or the area, the number of parts of the respective optical units 210a to 210e which each include a particular reflector, shade, projection lens, and the like is substantially high, thereby increasing the parts costs as well as manufacturing costs. Furthermore, the vehicle headlight 200 as described in Japanese Patent Application Laid-Open No. 2007-317604 is required to have many spaces for installing the respective optical units 210a to 210e. This configuration may lead to another problem in which it is difficult for the vehicle headlight 200 to include other lighting units such as a positioning lamp, a turn signal lamp, and the like in a limited area.

SUMMARY

The presently disclosed subject matter was devised in view of these and other problems and features in association with the conventional art. According to an aspect of the presently disclosed subject matter, a vehicle lighting unit serving as a vehicle headlight can form a light distribution pattern optimized according to the country or the area with smaller number of parts when compared with the conventional vehicle headlights of this type. Further, there can be provided a light guide lens for use in such a vehicle lighting unit.

According to another aspect of the presently disclosed subject matter, a vehicle lighting unit can include: a light source; and a light guide lens having a light incident face on which light emitted from the light source is incident, a light exiting face, a first lens face through which the light having been passed through the light incident face can pass, and a second lens face through which the light having been passed through the light incident face can pass. In this configuration, the first lens face can include a first reflecting surface that is formed to cover the first lens face in close relation thereto and have a reflector shape based on a surface shape of the first lens face, and the first reflecting surface can be configured to reflect part of the light having been passed through the light incident face and direct the light to the light exiting face to project the light forward, thereby forming a first light distribution pattern. Further, the second lens face can selectively include a second reflecting surface that is formed to cover the second lens face in close relation thereto and have a reflector shape based on a surface shape of the second lens face, and the second reflecting surface can be configured to reflect part of the light having been passed through the light incident face and direct the light to the light exiting face to project the light forward, thereby forming a second light distribution pattern.

In the vehicle lighting unit with the above configuration, the second reflecting surface can be selectively formed in the second lens face of the single light guide lens. Therefore, it is possible to form a light distribution pattern optimized according to the country or the area with smaller number of parts (namely, using a single light guide lens) when compared with the conventional vehicle headlight of this type.

In the vehicle lighting unit with the above configuration, the second lens surface can include the second reflecting surface or may not include the same.

If the second reflecting surface is formed, the vehicle lighting unit can project light to form a combined light distribution pattern including the second light distribution pattern formed by the light reflected by the second reflecting surface of the second lens surface in addition to the first light distribution pattern formed by the light reflected by the first reflecting surface of the first lens surface. On the contrary, if the second reflecting surface is not formed, the vehicle lighting unit can project light to form a light distribution pattern including only the first light distribution pattern. This system can be achieved with an inventive single light guide lens having the specific design.

According to still another aspect of the presently disclosed subject matter, a light guide lens can include a light incident face on which light emitted from the light source is incident, a light exiting face, a first lens face through which the light having been passed through the light incident face can pass, and a second lens face through which the light having been passed through the light incident face can pass. In this configuration, the first lens face can include a first reflecting surface that is formed to cover the first lens face in close relation thereto and have a reflector shape based on a surface shape of the first lens face, and the first reflecting surface can be configured to reflect part of the light having been passed through the light incident face and direct the light to the light exiting face to project the light forward, thereby forming a first light distribution pattern. Further, the second lens face can selectively include a second reflecting surface that is formed to cover the second lens face in close relation thereto and have a reflector shape based on a surface shape of the second lens face, and the second reflecting surface can be configured to reflect part of the light having been passed through the light incident face and direct the light to the light exiting face to project the light forward, thereby forming a second light distribution pattern.

In accordance with another aspect of the disclosed subject matter, a vehicle lighting unit can include a light source, and a light guide lens having a light incident face on which light emitted from the light source is incident, a light exiting face, a first lens face through which the light having been passed through the light incident face can pass, and a second lens face through which the light having been passed through the light incident face can pass. In this configuration, the first lens face can include a first reflecting surface that is formed to cover the first lens face in close relation thereto and have a reflector shape based on a surface shape of the first lens face, and the first reflecting surface can be configured to reflect part of the light having been passed through the light incident face and direct the light to the light exiting face to project the light forward, thereby forming a first light distribution pattern. Further, the second lens face can selectively include a second reflecting surface that is formed to cover the second lens face in close relation thereto and have a reflector shape based on a surface shape of the second lens face, and the second reflecting surface can be configured to reflect part of the light having been passed through the light incident face and direct the light to the light exiting face to project the light forward, thereby forming a second light distribution pattern.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments.

Further, note that the directions of up (high), down (low), right, left, front, and rear (back), and the like are defined on the basis of the actual posture of a lighting unit or a headlamp installed on a vehicle body, unless otherwise specified.

Figure 2:
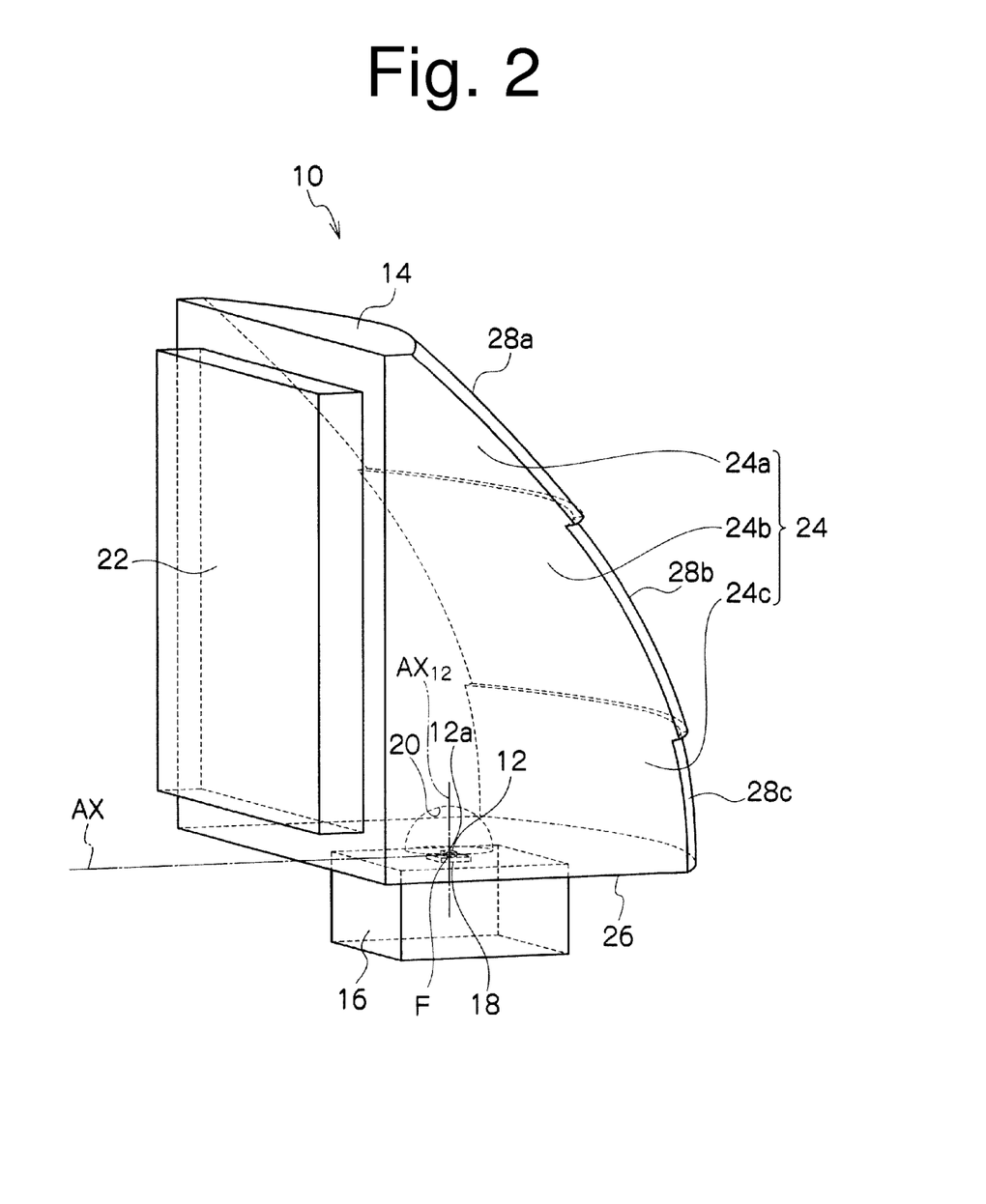
FIG. 2 is a perspective view of a vehicle lighting unit for use as a vehicle headlight, having a light guide lens according to one exemplary embodiment and made in accordance with principles of the presently disclosed subject matter.

FIG. 2 is a perspective view of a vehicle lighting unit 10 serving as a vehicle headlight, having a light guide lens 14 according to one exemplary embodiment made in accordance with principles of the presently disclosed subject matter.

Figure 3A:
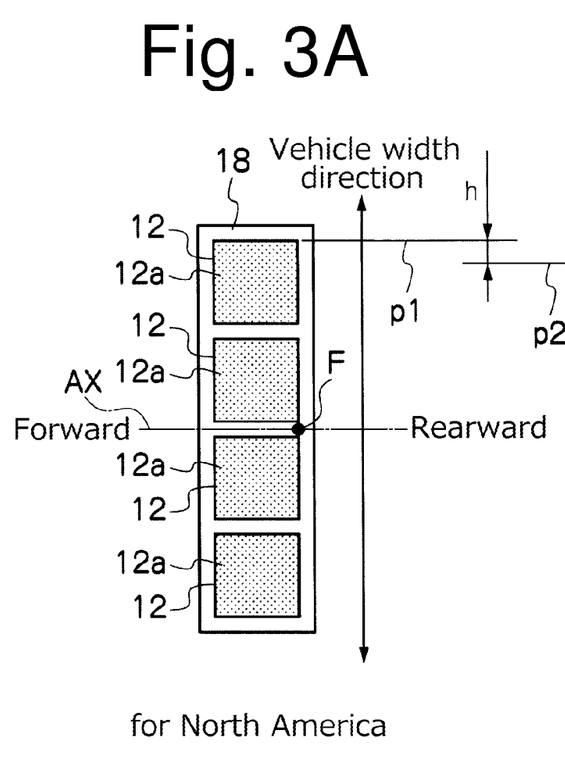
FIGS. 3A and 3B are a front view of a light source at a reference position p1 and a front view of a light source at a shifted position p2, respectively.
Figure 3B:
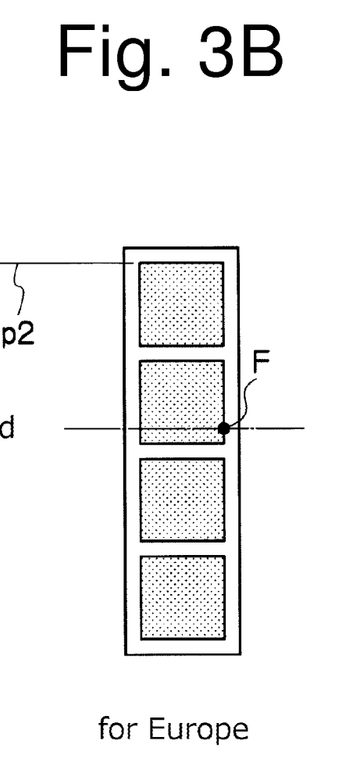
Figure 4A:
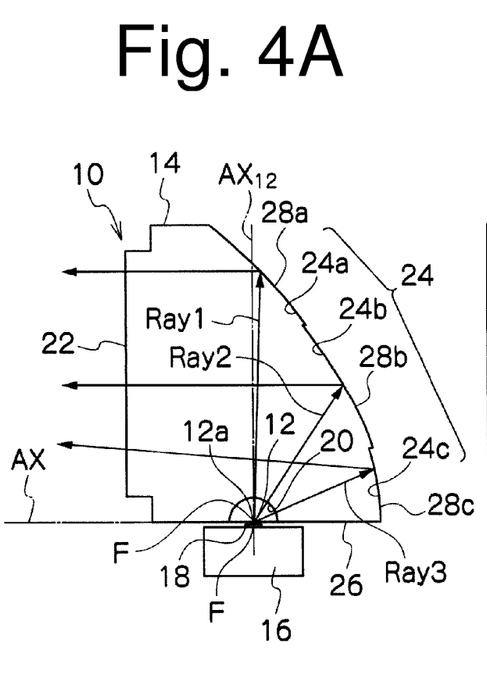
FIGS. 4A and 4B are a vertical cross-sectional view of a light guide lens having all reflecting faces provided at the rear lens face for North America, and a rear view of the light guide lens of FIG. 4A, respectively.
Figure 4B:
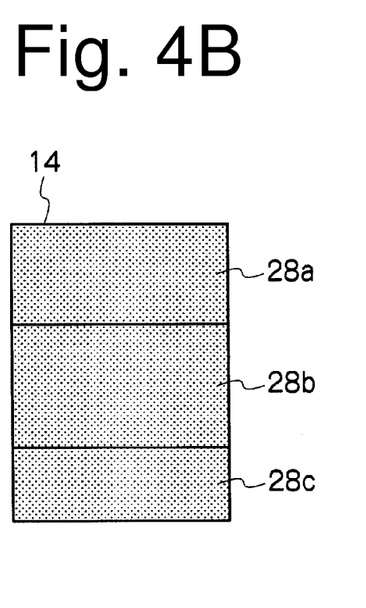

FIGS. 3A and 3B are a front view of a light source 12 at a reference position p1 and a front view of a light source 12 at a shifted position p2. FIGS. 4A and 4B are a vertical cross-sectional view of the light guide lens 14 having all reflecting faces 28a to 28c provided at the rear lens face 24 for North America, and a rear view of the light guide lens 14 of FIG. 4A, respectively.

As shown in FIGS. 2 and 4A, the vehicle lighting unit 10 of the present exemplary embodiment can include a light source 12, a light guide lens 14, and the like.

The light source 12 can be a semiconductor light emitting device such as a light emitting diode (LED) or a laser diode (LD), an incandescent lamp, or the like.

In the present exemplary embodiment, the light source 12 can be formed of four white LED light sources, each of which can be composed of an LED chip (for example, blue LED chip) and a wavelength conversion material such as a phosphor (for example, yellow phosphor such as YAG) in combination. The white LED light sources can each have a square light emission surface 12a (for example, with a side of 1 mm). The light emitted from the LED chip, or blue light, can excite the phosphor to be converted into yellow light. The yellow light can be mixed with the blue light passing through the phosphor (without excitation) to become pseudo white light for illumination. Note that the number of the light sources is not limited to four, but may be 1 to 3 or 5 or more.

As shown in FIGS. 2 to 5B, the four white LED light sources 12 can be mounted on a substrate 18 while the respective light emission surfaces 12a thereof are directed upward. Further, each of the respective sides of the squares of the white LED light sources 12 can be aligned with a horizontal line perpendicular to the optical axis AX which extends in a front-to-rear direction of a vehicle body, while the four white LED light sources 12 are disposed in line at predetermined intervals in a vehicle width direction (the direction in which the horizontal line perpendicular to the optical axis AX extends.) The substrate 18 can be secured to the top face of a holding member 16 (for example, heat sink).

The light guide lens 14 has a focal point F. In the present exemplary embodiment, the reference point for optical design may be referred to as the focal point F (i.e., optical center). The four white LED light sources 12 mounted on the substrate 18 can be arranged at or near (i.e., substantially at) the focal point F of the light guide lens 14.

In this manner, the four white LED light sources 12 can form an elongated rectangular light emission surface (formed by the four light emission surfaces each with a side of 1 mm) long in the vehicle width direction. The optical axis AX can pass through the approximate center of the line of the four white LED light sources 12 with respect to the vehicle width direction (see the reference position p1 of FIG. 3A).

The four white LED light sources 12 can be positioned at the reference position p1 (see FIG. 3A) or at a shifted position p2 (see FIG. 3B) which is shifted with respect to the reference position p1 by a distance h leftward in the vehicle width direction (the direction in which the horizontal line perpendicular to the optical axis AX extends). The distance h can be appropriately determined according to the shape of the reflecting surface of an upper reflecting face 28a to be described later.

As described, the four white LED light sources 12 can be positioned at any of the reference position p1 and the shifted position p2. In order to position the four white LED light sources 12, a guide mechanism can be adopted, which can include a guide member (not shown) extending in the vehicle width direction (the direction in which the horizontal line perpendicular to the optical axis AX extends) with the holding member 16 attached thereto so as to be slidable along the guide member in the vehicle width direction.

Such a guide mechanism can allow the holding member 16, to which the substrate 18 with the four white LED light sources 12 is fixed, to be slid along the guide member in the vehicle width direction (the direction in which the horizontal line perpendicular to the optical axis AX extends). In this manner, the four white LED light sources 12 can be located at any of the reference position p1 and the shifted position p2. Then, the holding member 16 can be fixed to the guide member by known means such as screwing at any of the reference position p1 and the shifted position p2, resulting in the fixation of the four white LED light sources 12 at the reference position p1 or the shifted position p2.

As shown in FIGS. 2 and 4A, the light guide lens 14 can include, at its surface, a light incident face 20 on which light emitted from the light source 12 is incident, a light exiting face 22 arranged on the front side of the vehicle body, and a rear lens face arranged on the rear side of the vehicle body.

The light guide lens 14 can be integrally molded by injecting a transparent resin (such as acrylic resin, polycarbonate resin, or the like) into a cavity of a mold, and cooling the resin for solidification. Note that the material of the light guide lens 14 is not limited to a transparent resin such as acrylic resin and polycarbonate resin, but may be a glass material, for example.

The light guide lens 14 can be fixed to an extension or a decoration member, a housing, or a vehicle body frame (which are all not shown) by known means so that the light incident face 20 is disposed in front of the light source 12 (upper region in FIGS. 2 and 4A). The light exiting face 22 is disposed on the front side of the vehicle body, and the rear lens face 24 is disposed on the rear side of the vehicle body.

The light incident face 20 can be formed on the bottom face 26 of the light guide lens 14, so as to be a concave spherical lens surface recessed towards the light guide lens 14 side. The light emitted from the light source 12 can enter the lens through the light incident face 20. The spherical center of the light incident face 20 can be located at or near the light source 12. Thus, the light from the light source 12 can enter the light guide lens 14 without refraction. Note that the light incident face 20 is not limited to a spherical lens face, but may be any lens face through which the light emitted from the light source 12 can enter the light guide lens 14.

The light exiting face 22 can be a planar lens face perpendicular to the optical axis AX, so that the light which is emitted from the light source 12, and which has entered the light guide lens 14 through the light incident face 20 can be reflected by reflecting faces 28a to 28c (as will be described later) and can exit through the light exiting face 22. Note that the light exiting face 22 can be a lens face configured to allow the light which is emitted from the light source 12, and which has entered the light guide lens 14 through the light incident face 20, and which has been reflected by the reflecting faces 28a to 28c, to exit therethrough without refraction (or with substantially no refraction), or can be a lens face configured to cause the light to exit therethrough with certain refraction in a prescribed direction.

The contour of the light exiting face 22 can be a rectangle, a square, a circle, an oblong, a polygon, or other shapes, when viewed from its front side, according to the vehicle body design and/or the specification of the vehicle.

The rear lens face 24 can be a parabolic reflecting face with a focal point F set at or near the light source 12, and can extend from the rear edge of the bottom face 26 upward so as to cover the front side of the light source 12 (upper side in FIGS. 2 and 4A). The rear lens face 24 can include an upper lens face 24a, an intermediate lens face 24b, and a lower lens face 24c. Note that the upper lens face 24a and the intermediate lens face 24b correspond to the first lens face while the lower lens face 24c corresponds to the second lens face in the presently disclosed subject matter.

The upper lens face 24a can be configured to allow the light which is emitted from the light source 12 and has entered the light guide lens 14 through the light incident face 20 to pass therethrough. The upper lens face 24a can be covered with an upper reflecting face 28a obtained by applying a coating thereto (aluminum deposition, high-reflective coating, silver deposition, and the like). Thus, the upper reflecting face 28a can be closely attached to the upper lens face 24a so as to have a reflecting surface shape according to the surface shape of the upper lens face 24a. See FIG. 4B wherein the hatched area shows the area where the coating is applied.

The upper reflecting face 28a can be a reflector with a shape corresponding to the shape of the upper lens face 24a due to the closely-attached structure. Specifically, this means that the upper reflecting face 28a can have a reflecting face with a shape transferred from the surface shape of the upper lens face 24a.

Therefore, the upper reflecting face 28a can be a parabolic reflecting face (revolved paraboloid or a free curved surface similar thereto) with a focal point set at or near the light source 12 and can have an optical axis AX (center axis) extending in the front-to-rear direction of the vehicle body.

Figure 6A:
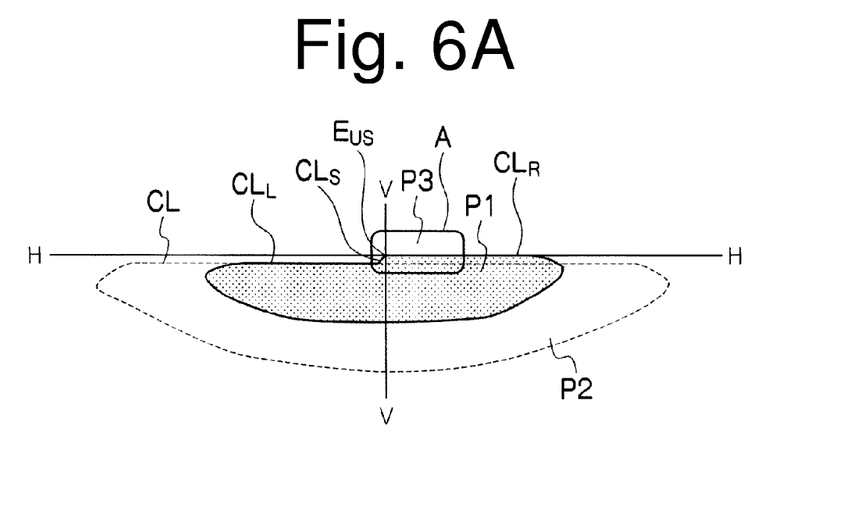
FIGS. 6A and 6B are an exemplary light distribution pattern formed by the light guide lens for North America of FIGS. 4A and 4B, and an exemplary light distribution pattern formed by the light guide lens for Europe of FIGS. 5A and 5B, respectively.

As shown in FIG. 4A, the light (for example, including a plurality of light source images) emitted from the light source 12 (located at the reference position p1) and entering the light guide lens 14 through the light incident face 20 can be reflected by the upper reflecting face 28a. Then the reflected light can pass through the light exiting face 22 to be projected forward, and can form a first light distribution pattern P1 on a virtual vertical screen assumed to be positioned in front of the vehicle body (in front of light exiting face 22) at a position about 25 m away from the vehicle. The first light distribution pattern P1 can be formed to include, as shown in FIG. 6A, a cut-off line (composed of a left cut-off line $CL_L$ extending horizontally, a slant cut-off line $CL_S$ extending rightward and obliquely upward from the right end of the left cut-off line $CL_L$, and a right cut-off line $CL_R$ extending horizontally from the upper end of the slant cut-off line $CL_S$).

The first light distribution pattern P1 can be formed so that the intersection $E_{US}$ between the slant cut-off line $CL_S$ and the right cut-off line $CL_R$ is positioned on the vertical line V-V, wherein the intersection $E_{US}$ corresponds to an upper elbow that serves as a standard point in the right-to-left direction.

Figure 7:
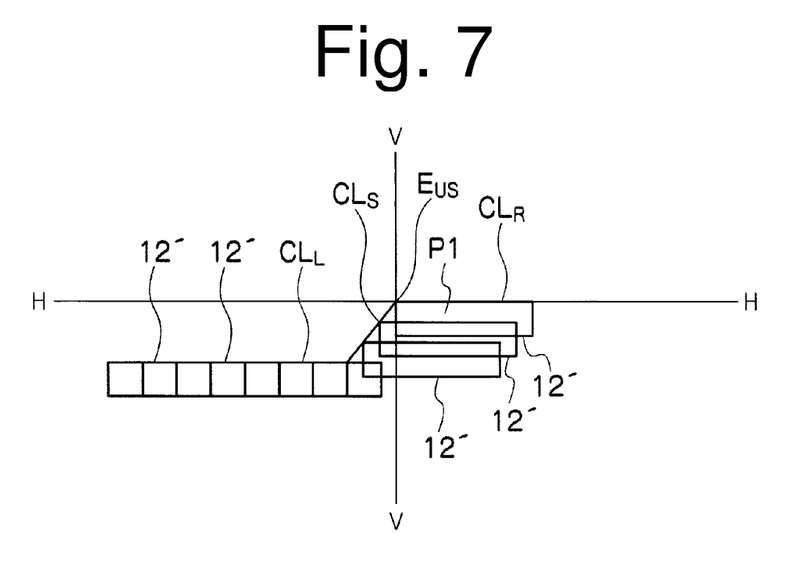
FIG. 7 is a diagram showing an example of a plurality of images 12' reflecting a light source (including a plurality of light sources), configured to form a cut-off line.

Note that the cut-off line composed of the left cut-off line $CL_L$, the slant cut-off line $CL_S$, and the right cut-off line $CL_R$ can be formed by inverting and projecting a plurality of light source images 12' as shown in FIG. 7, for example. FIG. 7 is a diagram showing an example of the plurality of light source images 12' which form the cut-off line.

In the present exemplary embodiment, the upper lens face 24a (or the upper reflecting face 28a) can be disposed on the optical axis $AX_{12}$ (center axis) of the light source 12. Therefore, the upper lens face 24a (the upper reflecting face 28a) can receive light rays Ray1 that have relatively high luminous intensity and are emitted from the light source 12 in narrow angular directions with respect to the optical axis $AX_{12}$ of the light source 12. (See FIG. 4A.) Thus, the first light distribution pattern P1 formed by the light rays Ray1 reflected by the upper reflecting face 28a can be a high illuminance pattern.

The intermediate lens face 24b can be configured to allow the light which is emitted from the light source 12 and which has entered the light guide lens 14 through the light incident face 20 to pass therethrough. The intermediate lens face 24b can be covered with an intermediate reflecting face 28*b* obtained by applying a coating thereto (aluminum deposition, high-reflective coating, silver deposition, and the like). Thus, the intermediate reflecting face 28*b* can be closely attached to the intermediate lens face 24*b* so as to have a reflecting surface shape according to the surface shape of the intermediate lens face 24*b*. (See FIG. 4B.)

The intermediate reflecting face 28*b* can be a reflector with the shape corresponding to the shape of the intermediate lens face 24*b* due to the closely-attached structure. Specifically, this means that the intermediate reflecting face 28*b* can have a reflecting face with a shape transferred from the surface shape of the intermediate lens face 24*b*.

Therefore, the intermediate reflecting face 28*b* can be a parabolic reflecting face (revolved paraboloid or a free curved surface similar thereto) with a focal point set at or near the light source 12 and can have an optical axis AX (center axis) extending in the front-to-rear direction of the vehicle body.

As shown in FIG. 4A, the light (for example, including a plurality of light source images) emitted from the light source 12 (located at the reference position p1) and entering the light guide lens 14 through the light incident face 20 can be reflected by the intermediate reflecting face 28*b*. Then the reflected light can pass through the light exiting face 22 to be projected forward, and can form a second light distribution pattern P2 on the virtual vertical screen assumed to be positioned in front of the vehicle body (in front of light exiting face 22) at a position about 25 m away from the vehicle. The second light distribution pattern P2 can be formed to be more horizontally and vertically diffused than the first light distribution pattern P1 and can include, as shown in FIG. 6A, a cut-off line CL extending horizontally and coinciding with the left cut-off line $CL_L$.

The intermediate lens face 24*b* (the intermediate reflecting face 28*b*) can receive light rays Ray2 that have relatively low luminous intensity and are emitted from the light source 12 in wider angular directions (as compared to upper reflecting face 28*a*) with respect to the optical axis $AX_{12}$ of the light source 12. (See FIG. 4A.) In addition to this, the second light distribution pattern P2 can be formed with the light rays Ray2 diffused horizontally and vertically. Thus, the second light distribution pattern P2 formed by the light rays Ray2 and reflected by the intermediate reflecting face 28*b* can be a lower illuminance pattern and wider in the horizontal and vertical directions than the first light distribution pattern P1.

The resulting first and second light distribution patterns P1 and P2 can be superimposed over each other as shown in FIG. 6A. Therefore, the resulting combined light distribution pattern of the high luminance first light distribution pattern P1 and the low luminance but wider second light distribution pattern P2 can serve as a low beam light distribution pattern with excellent far-distance visibility.

The lower lens face 24*c* can be configured to allow the light which is emitted from the light source 12 and which has entered the light guide lens 14 through the light incident face 20 to pass therethrough. The lower lens face 24*c* can selectively include a lower reflecting face 28*c* having a reflecting surface shape according to the surface shape of the lower lens face 24*c*.

For example, when a prescribed light distribution pattern for North America is to be formed by the vehicle lighting unit 10, the lower lens face 24*c* can be covered with a lower reflecting face 28*c* obtained by applying a coating thereto (aluminum deposition, high-reflective coating, silver deposition, and the like). Thus, the lower reflecting face 28*c* can be closely attached to the lower lens face 24*c* so as to have the reflecting surface shape according to the surface shape of the lower lens face 24*c*. (See FIG. 4B.)

The lower reflecting face 28*c* can be a reflector with the shape corresponding to the shape of the lower lens face 24*c* due to the closely-attached structure. Specifically, this means that the lower reflecting face 28*c* can have a reflecting face with a shape transferred from the surface shape of the lower lens face 24*c*.

Therefore, the lower reflecting face 28*c* can be a parabolic reflecting face (revolved paraboloid or a free curved surface similar thereto) with a focal point set at or near the light source 12 and can have an optical axis AX (center axis) passing through the position near the light source 12 and extending in the front-to-rear direction of the vehicle body.

As shown in FIG. 4A, the light (for example, including one of the light source images) emitted from the light source 12 (located at the reference position p1) and entering the light guide lens 14 through the light incident face 20 can be reflected by the lower reflecting face 28*c*. Then, the reflected light can pass through the light exiting face 22 to be projected forward, and can form a third light distribution pattern P3 on the virtual vertical screen assumed to be positioned in front of the vehicle body (in front of the light exiting face 22) at a position about 25 m away from the vehicle.

Note that the upper reflecting face 28*a* and the intermediate reflecting face 28*b* correspond to the first reflecting face while the lower reflecting face 28*c* corresponds to the second reflecting face in the presently disclosed subject matter.

Note that the lower reflecting face 28*c* can be formed by providing a reflecting member to the lower lens surface 24*c* so that the reflecting member is in close contact with the lower lens surface 24*c*. In this case the reflecting member can be formed from a metal plate with a mirror surface, a rigid material coated with a reflection material (white coating, aluminum deposition, or the like), and the like in the shape conforming to the shape of the lower reflection face 28*c*.

Figure 8:
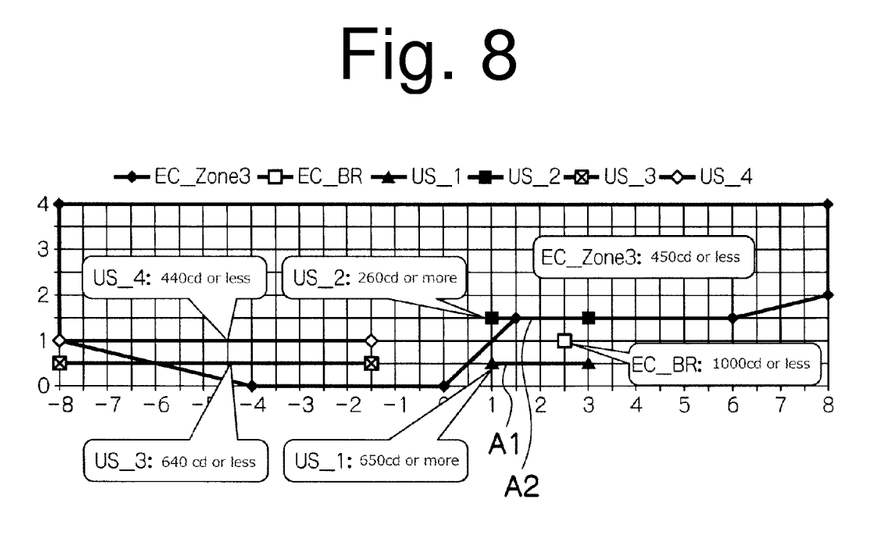
FIG. 8 is an explanatory diagram illustrating the specifications according to Regulations/Laws in North America and Europe (required value regulations including the measurement points and intensities).

FIG. 8 is an explanatory diagram illustrating specifications according to Regulations or Laws in North America and Europe (required value regulations including the measurement points and intensities).

As shown in FIG. 8, certain regulations/laws in North America requests manufacturers to produce vehicle lighting units so that a linear area A1 connecting a position at an angle of 1 degree rightward and an angle of 0.5 degrees upward and a position at an angle of 3 degrees rightward and an angle of 0.5 degrees upward and a linear area A2 connecting a position at an angle of 1 degree rightward and an angle of 1.5 degrees upward and a position at an angle of 3 degrees rightward and an angle of 1.5 degrees upward (on the virtual vertical screen) both illuminated by the lighting unit must be irradiated with light having a certain luminance or more in order to reliably illuminate road signs and the like with light. The rectangular area A in the light distribution pattern shown in FIG. 6A corresponds to the area covering the linear areas A1 and A2.

When the vehicle lighting unit 10 is configured to form the light distribution pattern for North America, the light source 12 can be disposed and fixed at the reference position p1 (see FIG. 3A). With this configuration, the first light distribution pattern P1 can be formed so that the intersection $E_{US}$ between the slant cut-off line $CL_S$ and the right cut-off line $CL_R$ is positioned on the vertical line V-V, wherein the intersection $E_{US}$ corresponds to an upper elbow that serves as a standard point in the right-to-left direction (see FIG. 6A).

In this manner, the respective light distribution patterns P1 to P3 can be formed to be overlaid on each other, so that the combined light distribution pattern including the intersection $E_{US}$ (the upper elbow as a standard point in the right-to-left direction) on the vertical line V-V can be formed to be optimized for North America, as shown in FIG. 6A.

Figure 5A:
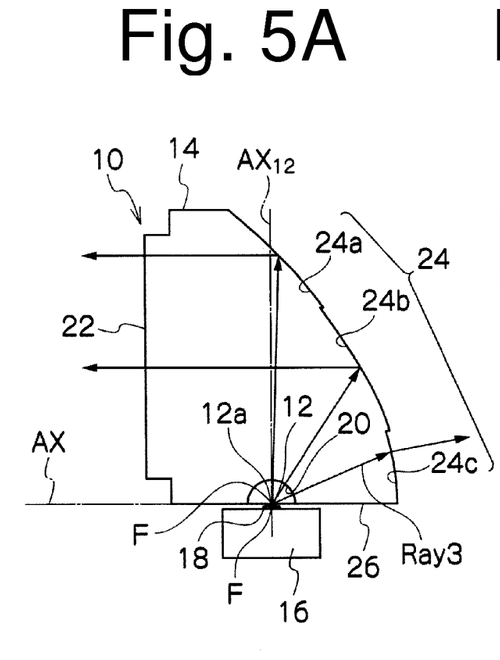
FIGS. 5A and 5B are a vertical cross-sectional view of the light guide lens having reflecting faces provided only at an upper lens face and an intermediate lens face of the rear lens face for Europe, and a rear view of the light guide lens of FIG. 5A, respectively.
Figure 5B:
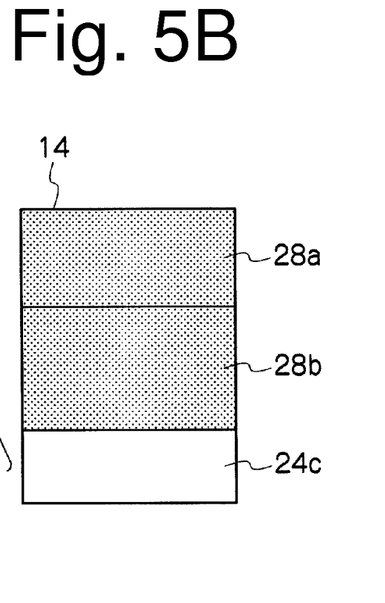

FIGS. 5A and 5B are a vertical cross-sectional view of the light guide lens 14 having the reflecting faces 28a and 28b provided only to the upper lens face 24a and the intermediate lens face 24b of the rear lens face 24 for Europe, and a rear view of the light guide lens 14 of FIG. 5A, respectively.

The specification for Europe does not require that the linear areas A1 and A2 be irradiated with light having a certain luminance or more. To comply with this situation, the lower lens face 24c is not provided with a coating (aluminum deposition, high-reflective coating, silver deposition, and the like) but can be formed as a plain lens surface without a reflection face to form a light distribution pattern for Europe (see FIG. 5B). Note that the hatched area on FIG. 4D shows the area where the coating is applied.

Figure 6B:
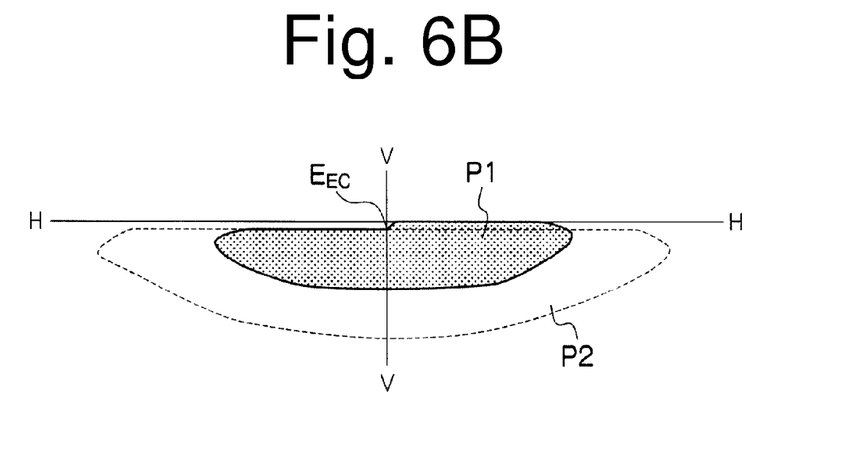

With this configuration, the light rays Ray3 directed toward the lower lens face 24c can pass through the lower lens face 24c to exit the light guide lens 14 (see FIG. 5A). Thus, the resulting combined light distribution pattern can include only the light distribution patterns P1 and P2 (see FIG. 6B). FIG. 6B is an exemplary light distribution pattern formed by the light guide lens 14 for Europe of FIGS. 5A and 5B, wherein the reflecting faces 28a and 28b are provided only to the upper lens face 24a and the intermediate lens face 24b.

When the vehicle lighting unit 10 is configured to form the light distribution pattern for Europe, the light source 12 can be disposed and fixed at the shifted position p2 which is shifted by the distance h from the reference position p1 in the vehicle width direction (the direction in which the horizontal line perpendicular to the optical axis AX extends) (see FIG. 3B). With this configuration, since the relative positional relationship between the light source 12 and the focal point of the upper reflecting face 28a can be changed, the first light distribution pattern P1 can be formed on the virtual vertical screen while it is moved rightward by a distance corresponding to the distance h, so that the intersection $E_{EC}$ between the left cut-off line $CL_L$ and the slant cut-off line $CL_S$ (a lower elbow that serves as a standard point in the right-to-left direction) is positioned on the vertical line V-V (see FIG. 6B).

In general, in order to shift a light distribution pattern horizontally on a virtual vertical screen, a vehicle lighting unit itself should be rotated (swiveled) around a vertical axis in the left or right direction. However, when doing so, the relative positional relationship between certain optical components such as a projection lens and a member arranged therearound such as an extension may change, thereby impairing fundamental function of certain components and/or appearance for aesthetic purpose.

By contrast, the present exemplary embodiment can be configured such that the light guide lens 14 is placed in position and the light source 12 can be shifted with respect to the fixed light guide lens 14, for example, between the standard position p1 and the shifted position p2, thereby shifting the first light distribution pattern P1. This can prevent the fundamental function of components and/or its appearance for aesthetic purpose from being changed or impaired even when the light distribution pattern is changed.

In this manner, only the light distribution patterns P1 and P2 can be formed to be overlaid on each other, so that the combined light distribution pattern including the intersection $E_{EC}$ (the lower elbow as a standard point in the right-to-left direction) on the vertical line V-V can be formed to be optimized for Europe, as shown in FIG. 6B.

In the exemplary embodiment, the first lens face can have two lens faces including the upper lens face 24a and the intermediate lens face 24b, but the presently disclosed subject matter is not limited to this. For example, the first lens face can include a single lens face or three or more lens faces. If the first lens face is composed of three or more lens faces, the resulting plurality of light distribution patterns can be overlaid on each other, and it is possible to form a combined light distribution pattern (such as a low-beam light distribution pattern) with excellent far distance visibility (meaning that the intensity is maximum at the center of the pattern and gradually lowered toward the peripheral area).

As described above, the vehicle lighting unit according to the present exemplary embodiment with the above configuration can include the lower reflecting face 28c (the second reflecting surface) that can be selectively formed in the lower lens face 24c (the second lens face) of the single light guide lens 14. Therefore, it is possible to form a light distribution pattern optimized according to the country or the area such as one for North America shown in FIG. 6A and one for Europe shown in FIG. 6B with smaller number of parts (namely, using a single light guide lens 14) when compared with conventional vehicle headlights of this type.

Furthermore, the vehicle lighting unit according to the present exemplary embodiment with the above configuration can include the lower lens face 24c (the second lens surface) that can have the lower reflecting face 28c (the second reflecting surface). Thus, the vehicle lighting unit can project light to form a combined light distribution pattern including the third light distribution pattern P3 formed by the light rays Ray3 reflected by the lower reflecting face 28c of the lower lens face 24c in addition to the first and second light distribution patterns P1 and P2 formed by the light rays Ray1 and Ray2 reflected by the upper and intermediate reflecting faces 28a and 28b of the upper and intermediate lens faces 24a and 24b, so that the resulting light distribution pattern can be optimized for North America (see FIG. 6A).

Further, the vehicle lighting unit according to the present exemplary embodiment with the above configuration can include the lower lens face 24c (the second lens surface) that can have no reflecting face (meaning that the lower lens face 24c is formed as a plain lens face). Thus, the vehicle lighting unit can project light to form a combined light distribution pattern including only the first and second light distribution patterns P1 and P2 formed by the light rays Ray1 and Ray2 reflected by the upper and intermediate reflecting faces 28a and 28b of the upper and intermediate lens faces 24a and 24b, so that the resulting light distribution pattern can be optimized for Europe (see FIG. 6B).

A description will now be given of exemplary modifications.

In the above exemplary embodiment, the light distribution pattern for North America can be formed by the first light distribution pattern P1 wherein the intersection $E_{US}$ between the slant cut-off line $CL_S$ and the right cut-off line $CL_R$ (the upper elbow that serves as a standard point in the right-to-left direction) is positioned on the vertical line V-V. However, the presently disclosed subject matter is not limited thereto.

According to the regulation for North America, it is not limited to position the intersection $E_{US}$ between the slant cut-off line $CL_S$ and the right cut-off line $CL_R$ (the upper elbow that serves as a standard point in the right-to-left direction) on the vertical line V-V. In the present exemplary embodiment, this configuration has been employed to improve the far distance visibility.

By contrast, for compliance in Europe, the design may be limited to position the intersection $E_{EC}$ between the left cut-off line $CL_L$ and the slant cut-off line $CL_S$ (the lower elbow that serves as a standard point in the right-to-left direction) on the vertical line V-V.

In other words, the light distribution pattern for Europe wherein the intersection $E_{EC}$ between the left cut-off line $CL_L$ and the slant cut-off line $CL_S$ (the lower elbow that serves as a standard point in the right-to-left direction) is positioned on the vertical line V-V can be utilized to form the light distribution pattern for North America (see FIG. 6B). Specifically, for example, when the four white LED light sources 12 are positioned and fixed at the positions corresponding to the shift position p2, the light distribution pattern P1 with the intersection $E_{EC}$ between the left cut-off line $CL_L$ and the slant cut-off line $CL_S$ (the lower elbow that serves as a standard point in the right-to-left direction) positioned on the vertical line V-V can be shared for the light distribution pattern for North America.

In this configuration, although the illuminance at the intersection between the horizontal line H-H and the vertical line V-V may be slightly decreased, the resulting light distribution pattern can still be utilized both for North America and for Europe. Therefore, since it is not necessary to move the light source 12, a guide mechanism can be eliminated.

In this modification, by selectively forming the lower reflecting face 28c on the lower lens face 24c of the single light guide lens 14, as in the above exemplary embodiment, the light distribution patterns can be optimized according to the country or the area with smaller number of parts when compared with the conventional vehicle lighting unit of this type.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit comprising:
a light source having an optical axis; and
a light guide lens having a light incident face which is formed on a bottom face of the light guide lens and on which light emitted from the light source during operation is incident, a light exiting face which is formed on a front face of the light guide lens, a first lens face which is formed on a rear face of the light guide lens so as to be disposed on the optical axis of the light source and through which a first portion of the light which has passed through the light incident face passes, and a second lens face which is formed on the rear face of the light guide lens so as to be disposed more rearward than the first lens face and through which a second portion of the light which has passed through the light incident face passes, wherein
the first lens face includes a first reflecting surface covering the first lens face in close relation thereto and the first reflecting surface having a reflector shape based on a surface shape of the first lens face, and the first reflecting surface being configured to reflect the first portion of the light which has passed through the light incident face and to direct the first portion of the light to the light exiting face to project the light forward, thereby forming a first light distribution pattern, and
the second lens face selectively includes one of,
a second reflecting surface covering the second lens face in close relation thereto and the second reflecting surface having a reflector shape based on a surface shape of the second lens face, and the second reflecting surface being configured to reflect the second portion of the light which has passed through the light incident face and to direct the second portion of the light to the light exiting face to project the light forward, thereby forming a second light distribution pattern in a linear area connecting a position at an angle of 1 degree rightward and an angle of 0.5 degrees upward and a position at an angle of 3 degrees rightward and an angle of 0.5 degrees upward and a linear area connecting a position at an angle of 1 degree rightward and an angle of 1.5 degrees upward and a position at an angle of 3 degrees rightward and an angle of 1.5 degrees upward on a virtual screen assumed to be positioned in front of the vehicle lighting unit at a position about 25 m away from the vehicle lighting unit so that the first light distribution pattern and the second distribution pattern are overlaid on each other, and
a see-through surface configured to allow light that has entered the light guide lens through the light incident face formed on the bottom face and has been incident thereon to freely pass rearward to a location outside the light guide lens.

2. The vehicle lighting unit according to claim 1, wherein the second lens face includes the second reflecting surface formed thereon.

3. The vehicle lighting unit according to claim 1, wherein the second lens face is provided with a reflecting member as the second reflecting surface so that the reflecting member is in close contact with the second lens face.

4. The vehicle lighting unit according to claim 1, wherein the second lens face includes the see-through surface formed thereon.

5. The vehicle lighting unit according to claim 1, wherein the light source includes a light emitting diode.

6. The vehicle lighting unit according to claim 1, wherein the light source includes a plurality of light emitting diodes.

7. The vehicle lighting unit according to claim 6, wherein the plurality of light emitting diodes are aligned along a longitudinal axis, and the light guide lens has a focal point located on a focal axis that is substantially perpendicular to the longitudinal axis, wherein the focal axis is located at a center of the longitudinal axis defined by an extent of the plurality of light emitting diodes.

8. The vehicle lighting unit according to claim 6, wherein the plurality of light emitting diodes are aligned along a longitudinal axis, and the light guide lens has a focal point located on a focal axis that is substantially perpendicular to the longitudinal axis, wherein the focal axis is spaced from a center of the longitudinal axis.

9. A light guide lens comprising:
a light incident face configured to receive light emitted from a light source having an optical axis and formed on a bottom face of the light guide lens;
a light exiting face which is formed on a front face of the light guide lens;
a first lens face formed on a rear face of the light guide lens so as to be disposed on the optical axis of the light source and configured to receive and transmit light which has passed through the light incident face; and
a second lens face formed on the rear face of the light guide lens so as to be disposed more rearward than the first lens face and configured to receive and transmit light which has passed through the light incident face, wherein
the first lens face includes a first reflecting surface covering the first lens face in close relation thereto, the first reflecting surface having a reflector shape based on a surface shape of the first lens face, and the first reflecting surface being configured to reflect part of the light which has passed through the light incident face and to direct the light to the light exiting face to project the light forward, thereby forming a first light distribution pattern, and the second lens face includes at least one of
- a see-through surface configured to allow light that has entered the light guide lens through the light incident face formed on the bottom face and has been incident thereon to freely pass rearward to a location outside the light guide lens, and
- a second reflecting surface covering the second lens face in close relation thereto, the second reflecting surface having a reflector shape based on a surface shape of the second lens face, and the second reflecting surface being configured to reflect part of the light which has passed through the light incident face and to direct the light to the light exiting face to project the light forward, thereby forming a second light distribution pattern in a linear area connecting a position at an angle of 1 degree rightward and an angle of 0.5 degrees upward and a position at an angle of 3 degrees rightward and an angle of 0.5 degrees upward and a linear area connecting a position at an angle of 1 degree rightward and an angle of 1.5 degrees upward and a position at an angle of 3 degrees rightward and an angle of 1.5 degrees upward on a virtual screen assumed to be positioned in front of the vehicle lighting unit at a position about 25 m away from the vehicle lighting unit so that the first light distribution pattern and the second distribution pattern are overlaid on each other.

10. The light guide lens according to claim 9, wherein the second lens face includes the second reflecting surface formed directly thereon.

11. The light guide lens according to claim 9, wherein the second lens face is provided with a reflecting member as the second reflecting surface so that the reflecting member is in close contact with the second lens face.

12. The light guide lens according to claim 9, wherein the second lens face includes the see-through surface formed thereon.

13. The light guide lens according to claim 9, wherein the second lens face is separated from the first lens surface by a step that extends substantially perpendicular to the optical axis of the light source.

* * * * *